United States Patent [19]
Manende et al.

[11] Patent Number: 6,138,949
[45] Date of Patent: Oct. 31, 2000

[54] MAIN ROTOR PYLON SUPPORT STRUCTURE

[75] Inventors: Lawrence Manende, North Haven, Conn.; Robert N. Herkimer, Tyler Hill, Pa.

[73] Assignee: Sikorsky Aircraft Corporation, Stratford, Conn.

[21] Appl. No.: 09/183,758

[22] Filed: Oct. 30, 1998

[51] Int. Cl.[7] ........................................ B64C 1/10
[52] U.S. Cl. ...................... 244/17.27; 244/119; 244/121
[58] Field of Search ............................ 244/17.11, 17.27, 244/117 R, 119, 129.1, 129.2, 1 R, 121

[56] References Cited

U.S. PATENT DOCUMENTS

| | | | |
|---|---|---|---|
| 4,593,870 | 6/1986 | Cronkhite et al. | 244/117 R |
| 5,156,360 | 10/1992 | Shine | 244/129.1 |
| 5,310,137 | 5/1994 | Yoerkie, Jr. et al. | 244/17.27 |

*Primary Examiner*—Galen L. Barefoot
*Attorney, Agent, or Firm*—Seidel, Gonda, Lavorgna & Monaco, PC

[57] ABSTRACT

A helicopter main rotor pylon support structure including a framing structure for supporting the loads applied to the main rotor pylon, and a fire shield for preventing fire from transmitting from an engine or exhaust compartment into an adjacent compartment. The framing structure includes first and second composite main beams, each beam extending adjacent to a engine compartment and an exhaust duct compartment. A plurality of bridge members preferably extend between and connect with the first and second main beams and are formed integral therewith. A plurality of vertical posts are attached to and spaced along the main beams. The vertical posts are engaged with discrete attachment points on the helicopter. There is at least one fire panel mounted to each main beam. The fire panel has side edges which are slidingly engaged with the vertical posts, and a lower edge which is slidingly engaged with a flange formed on the helicopter. The sliding engagement of the edges of the fire panel is designed to allow in-plane motion of the panel edges while limiting out-of-plane displacements. The sliding engagements are also designed to prevent the transmission of fire past the fire panel.

17 Claims, 8 Drawing Sheets

MAIN ROTOR PYLON SUPPORT STRUCTURE

FIELD OF THE INVENTION

The present invention relates to a improved support structure for a helicopter main rotor pylon. More specifically, an improved main rotor pylon support structure is provided which is less costly to manufacture, provides increased aircraft accessibility, is lightweight, and provides fire protection.

BACKGROUND OF THE INVENTION

A main rotor pylon in a helicopter aircraft provides several key features. First, the main rotor pylon shrouds the helicopter transmission, the engines, the engine exhausts., and the equipment bays preventing contaminants from entering into them. Second, the pylon also provides a walking surface for maintenance personnel to access and inspect the main rotor system. The helicopter main rotor requires considerable maintenance. Hence, the ability to use the main rotor pylon as a walking surface is especially important.

Conventional main rotor pylons include an external skin affixed to an internal support structure. The support structure extends from just forward of the engine compartment past the engine exhaust. A conventional main rotor pylon support structure is shown in FIG. 1 and typically includes metallic framing members and shear panels. The shear panels function in conjunction with the framing members to provide the necessary support to accommodate the anticipated walking loads which is prescribed by government standard as 450 pounds. The framing members include upper caps bolted or riveted to spaced vertical stiffeners. The vertical stiffeners, in turn, are bolted or riveted to the top of the helicopter cabin. The caps and vertical stiffeners are typically either channel, T or L-shaped components. The sheet metal shear panels are riveted to the caps, the vertical stiffeners and the cabin to form a rigid support structure.

One FAA requirement imposed on many larger helicopters is that a fireproof wall must separate any compartments located adjacent to an engine or exhaust compartment. Since the main rotor pylon support structure is located adjacent to the engine compartment and the engine exhaust compartment, the materials used to fabricate the structure must be selected so as to prevent fire from passing from these compartments into the interior of the main rotor pylon. Also, the support structure must be designed to accommodate the normal heat that is generated around the engine or exhaust, which can be in excess of 1000° F. These requirements have, up to the present day, necessitated the use of titanium and/or steel for the framing members, the shear panels and cabin skins.

There are several deficiencies with the prior art main rotor pylons. First, titanium and steel are relatively expensive materials and are heavier than aluminum and composite structures. The additional weight typically requires the incorporation of additional stiffening members. Furthermore, the manufacturing of conventional support structures has required that the framing structures, i.e., the frame caps and the vertical stiffeners, be painstakingly riveted to the shear panels in order to form the support structure. Hence, the time to fabricate a conventional support structure has been quite considerable.

Furthermore, since the framing members and shear panels are all riveted to one another, it is important to accurately fabricate and attach these components in order to prevent the need for modifications during the assembly process. The difficulty in maintaining this accuracy is evidenced by the fact that if one were to place two actual support structures side be side, there would be slight differences in the structure. While these differences are not critical to the structural integrity of the components, any modifications that are required typically add additional time to the manufacturing process to ensure the proper fit or interchangeability of those components.

In the conventional support structure, since the shear panels are riveted to the framing members and the cabin, it is not possible to readily access the engine and/or internal compartments through the shear panels. As such, doors must be added to the panels if access is needed, increases the time and cost associated with fabricating the support structure.

Another deficiency that results in conventional shear panel structures is the development of cracks. Shear panels tend to crack when subjected to alternating tension and compression loads. These alternating loads tend to cause the shear panel to "oil can." Oil canning is the phenomenon where the panel deforms out of plane. The alternating loads can be the result of takeoff and landing which induce somewhat sudden loads on the aircraft support structure. When a crack develops in a shear panel, the panel must be replaced or repaired.

Conventional main rotor pylon support structures are also designed to transfer some of the applied loads directly to the cabin skin, instead of to an attachment point, such as a helicopter frame. This is an inefficient way of transferring the walking loads into the aircraft and may necessitate the addition of further stiffening elements to provide adequate structural support for the cabin skin.

A need, therefore, exists for an improved main rotor pylon support structure which provides fire protection, is easy to manufacture, provides increased aircraft accessibility, and is light in weight.

SUMMARY OF THE INVENTION

One object of the present invention is to provide a lightweight fireproof support structure for a helicopter main rotor pylon which can sustain walking loads.

This and other objects of the invention are provided by a helicopter main rotor pylon support structure. The support structure includes a framing structure for supporting the loads applied to the main rotor pylon, and a fire shield for preventing fire from transmitting from an engine or exhaust compartment into an adjacent compartment.

The framing structure includes first and second composite main beams, each beam extending adjacent to a engine compartment and an exhaust duct compartment. The beams are preferably made from graphite plies.

A plurality of bridge members preferably extend between and connect with the first and second main beams. In a preferred embodiment of the invention, the bridge members are made from graphite plies and are formed integral with the first and second main beams.

A plurality of vertical posts are attached to and spaced along the main beams. The vertical posts are mounted to discrete attachment points on the helicopter. Seal plates are mounted to the vertical posts.

There is at least one fire panel mounted to each main beam. The fire panel has a side edge disposed between the seal plate and the vertical post such that the side edge is permitted to move in-plane between the seal plate and the vertical post while limited in out-of-plane displacement by the seal plate and the vertical post. The engagement of the side edge and the seal plate is designed to prevent the transmission of fire past the fire panel.

In one embodiment of the invention, there is a flange member extending upward from the helicopter which slidingly engages with a channel formed on and extending along at least a portion of a lower edge of the fire panel. The engagement of the within the lower edge and the flange member limiting out-of-plane displacement of the lower edge of the fire panel while permitting in-plane motion and designed to prevent the transmission of fire past the fire panel.

A seal material may be incorporated between the side and lower edges and their respective attachments to further prevent transmission of fire therebetween.

A fire shell is mounted between the frame structure and the engine exhaust to prevent the transmission of fire to the frame structure.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 2:
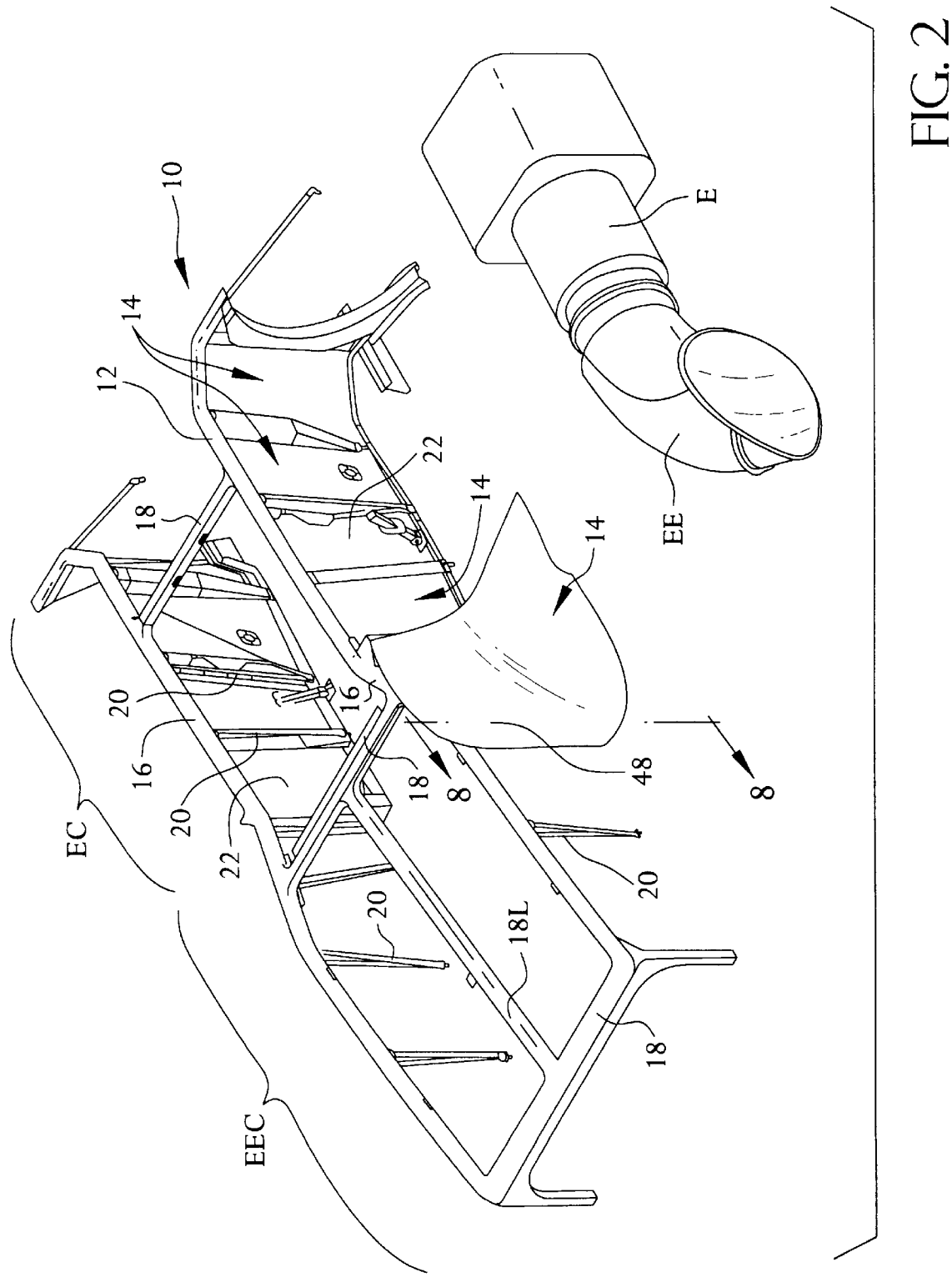
FIG. 2 is a isometric view of a main rotor pylon support structure according to the present invention.

Referring now to the drawings, wherein like reference numerals illustrate corresponding or similar elements throughout the several views, FIG. 2 illustrates a main rotor support structure 10 according to the present invention. The support structure 10 is mounted to the upper deck or skin of a helicopter cabin (not shown), around the main rotor (not shown), and is adjacent to the aircraft engine E and engine exhaust duct EE. The support structure 10 includes a frame structure 12 and vertical posts 20 for withstanding the applied loads, and a fire shield 14 for preventing fire from transmitting from an engine compartment into an adjacent compartment. The frame structure 12 is shown more clearly in FIG. 3 and includes at least one, and more preferably two, main beams 16. Each main beam 16 extends adjacent to an engine compartment EC and an engine exhaust compartment EEC and is preferably continuous along its entire length. The main beam 16, in one preferred embodiment, is an inverted U-shaped channel which preferably has a width that varies between approximately 2.0 inches to 3.0 inches, and vertical legs that vary between approximately 1.0 inch to 2.00 inches. The channel thickness varies between approximately 0.069 inches to 0.100 inches.

The main beam 16 is preferably made from composite material, such as lay-up of graphite/epoxy plies. Graphite material is preferred because it is light weight and has high tensile strength characteristics. A suitable epoxy resin material is used as the matrix for the laminate. One preferred epoxy for use in the present invention is Hexcel 8552, sold by Hexcel Corporation, Dublin, Calif. This resin has very good high temperature performance. Those skilled in the art would readily be capable of selecting an appropriate resin material. The ply lay-up preferably includes unidirectional (0°) plies sandwiched between woven (e.g., ±45 and/or 0/90) plies. In one preferred embodiment, the main beam has a basic cross-section lay-up which includes ±45 outer plies, 0/90 intermediate plies, and two 0° unidirectional central plies.

Figure 3:
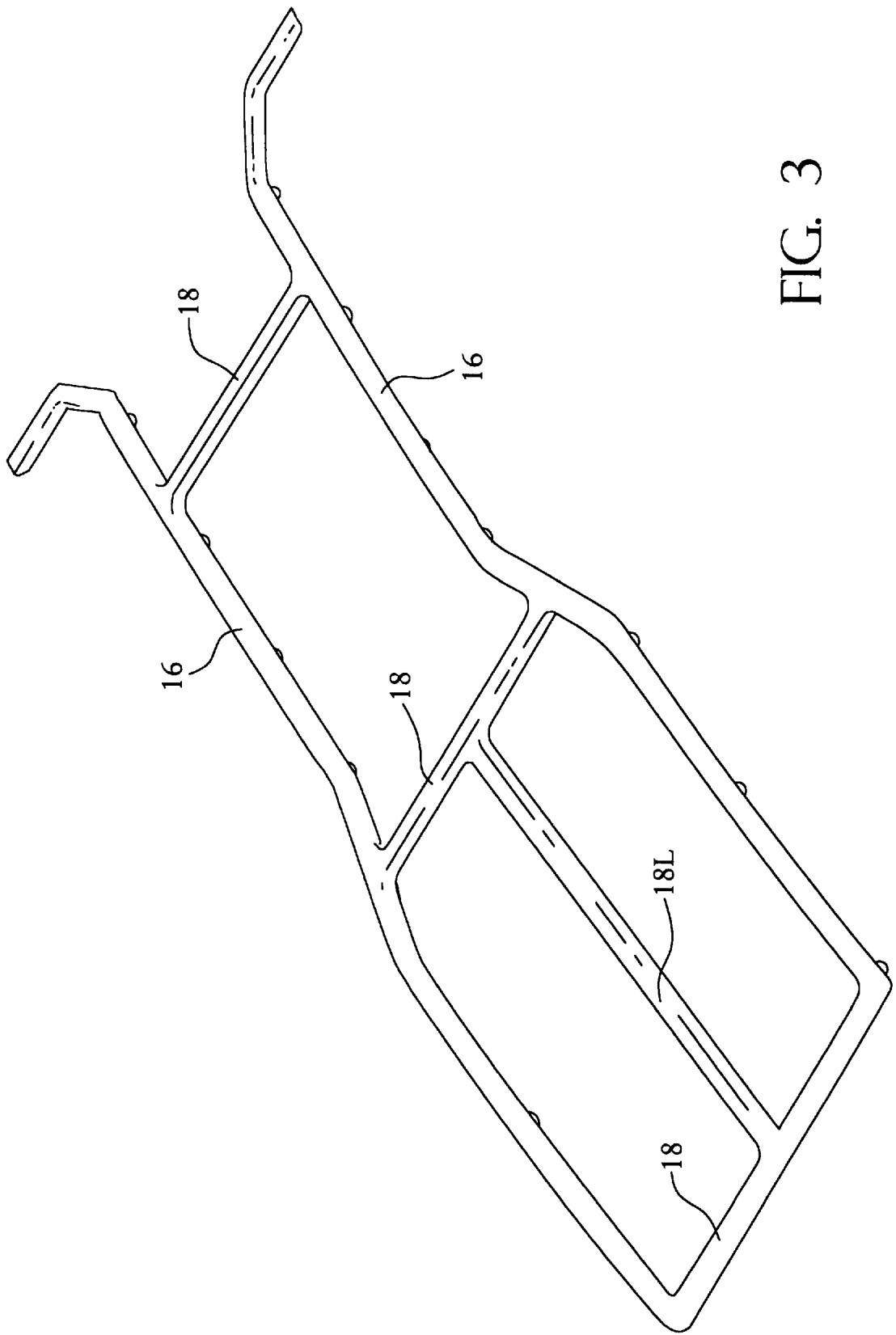
FIG. 3 is a isometric view of the main beam portion of the main rotor pylon support structure according to one aspect of the invention.

As noted above, there are preferably two main beams 16, one extending adjacent to each engine compartment EC. The main beams 16 are preferably interconnected by bridge members 18 for additional support and dimensional stability. The bridge members 18 are also preferably channel shaped and made from composite material, such as a ply lay-up of graphite material. As shown in FIG. 3, there are preferably three cross bridge members 18 that extend between the main beams 16, and one longitudinal bridge member 18L that extends between two of the cross bridges 18. The cross bridge members 18 and longitudinal bridge member 18L can be located at compartment breaks if desired.

In order to facilitate the manufacturing process, the main beams 16 and the bridge members 18, 18L are made as an integral unit. This is accomplished by laying the plies for the bridge members 18, 18L and the main beams 16 in a mold at the same time. By forming the beams 16 and bridge members 18, 18L as an integral unit, separate attachment steps are eliminated, thereby reducing the time required to form this component of the support structure 10. However, if desired, the main beams 16 and bridge members 18, 18L can be formed as separate components which are subsequently attached together. The main beam 16 and bridge members 18, 18L are preferably designed to support the anticipated walking loads with little deflection.

The frame structure 12 also includes spaced apart vertical posts 20 which connect the main beams 16 to discrete helicopter mounting points. The vertical posts 20 are preferably channel shaped and have a width sized to fit within the main beam 16 channel. The vertical posts 20 adjacent to the engine exhaust compartment EEC are preferably made from aluminum material. The vertical posts 20 adjacent to the engine compartment EC are preferably made from titanium material. The bottom ends of the vertical posts 20 preferably attach to the discrete mounting points (frames and/or beams) in the aircraft through any conventional means known to those skilled in the art, such as eye bolt attachments. The vertical posts 20 provide the primary means for transferring loads from the main beams 16 to the aircraft framing structure.

Figure 4:
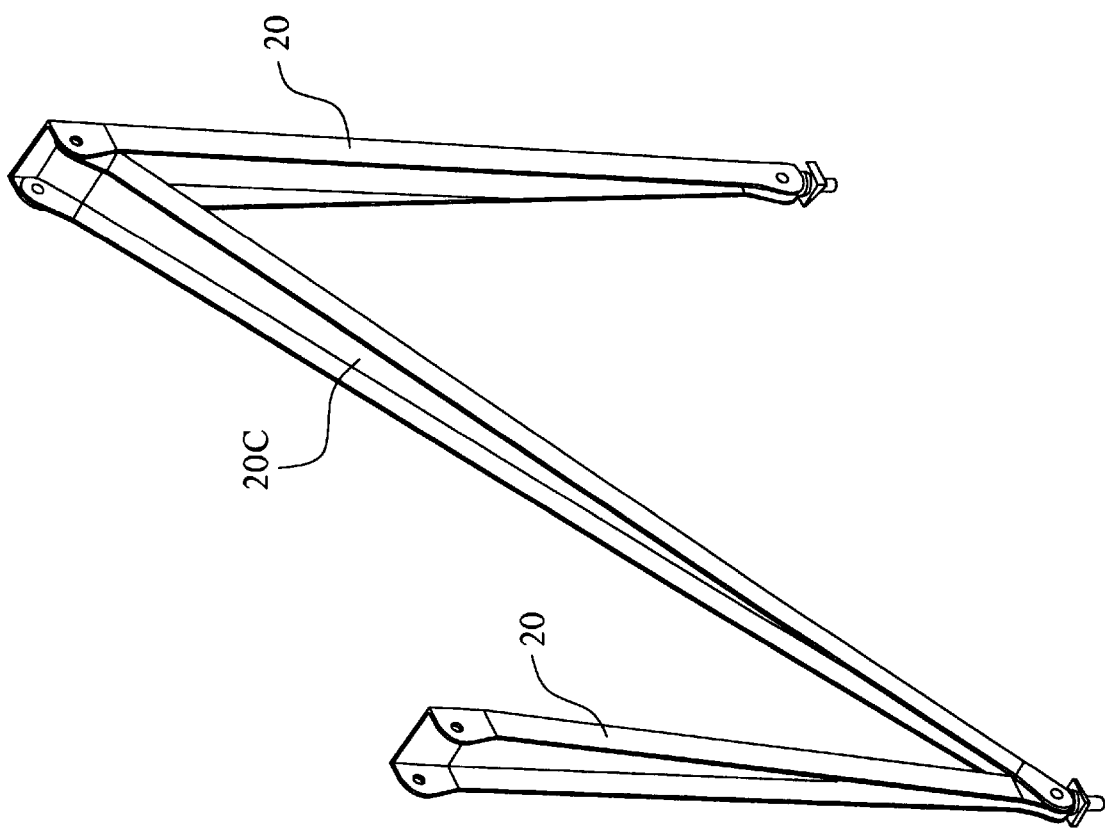
FIG. 4 is an isometric view of the vertical posts that are located adjacent to the engine exhaust compartment.

As shown in FIG. 4, the vertical posts 20 in the portion of the framing structure 12 adjacent to the engine exhaust compartment EEC taper in width toward their lower end where they attach to the discrete aircraft mounting points. The tapered shape of the vertical posts 20 reduces the post's weight. Also, depending on the applied loads, cross posts 20C may be added to provide additional support for the main beam and to further assist in transferring the applied loads directly to the discrete fuselage mounting points. As will be discussed in more detail below, the vertical posts 20 and cross posts 20C are shielded from the engine exhaust duct EE and, therefore, since fire and excessive heat are not a concern, the posts 20, 20C in this portion of the framing structure are made from a lightweight material, such as aluminum. The upper ends of the vertical posts 20 are preferably bolted to the main beams 16.

Referring back to FIG. 1, an aft frame 86 can be incorporated into the design to further support the frame structure 12. In the present invention, the aft frame 86 is fastened to an aft bridge member 18 and attaches to a discrete mounting point on the airframe.

Figure 7:
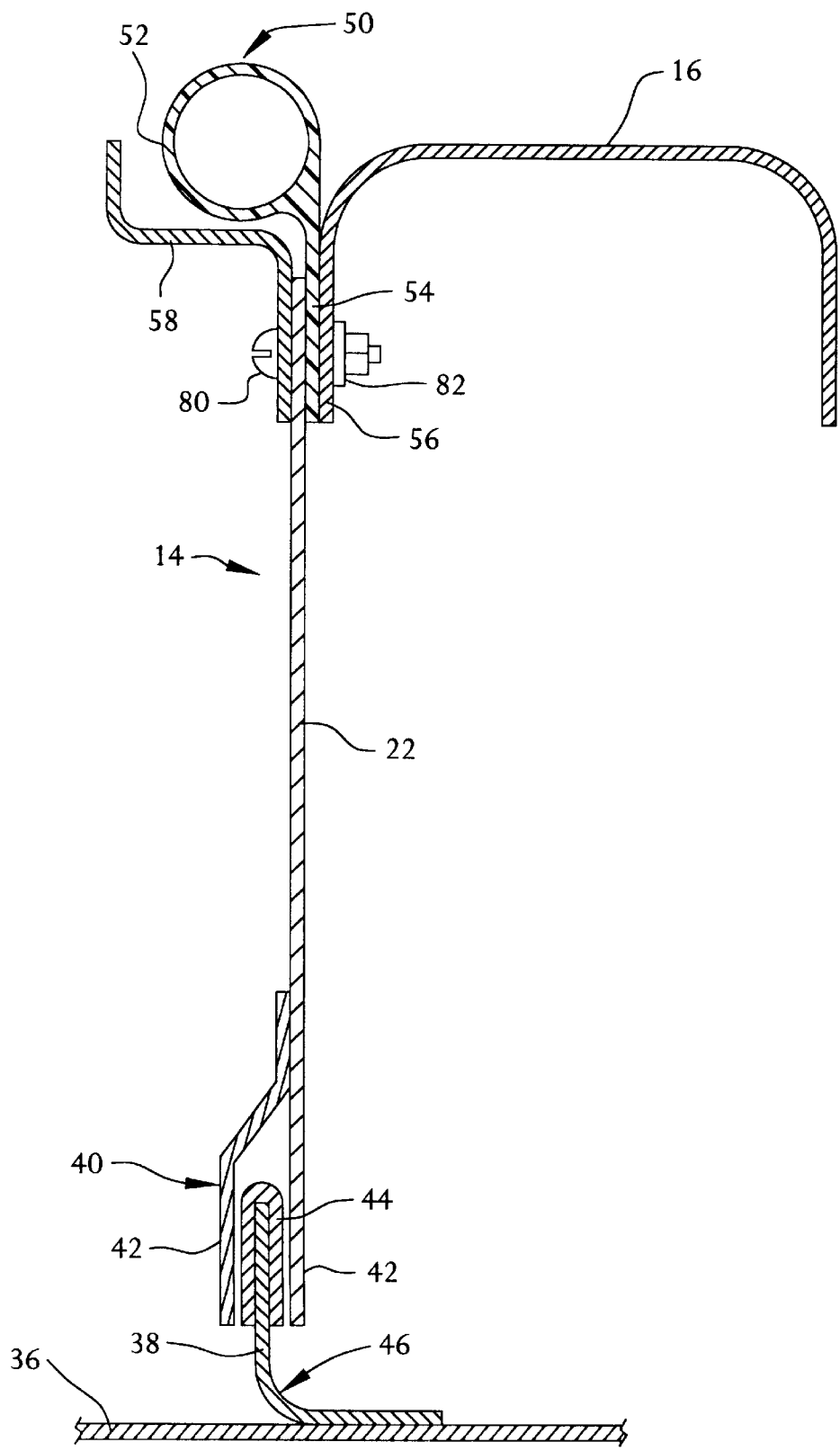
FIG. 7 is a cross-sectional view of the main rotor pylon support structure according to the present invention taken along lines 7—7 of FIG. 5.

As discussed above, FAA regulations require that engine and exhaust compartments EC, EEC be separated from adjacent compartments by a fire proof structure. The present invention meets this FAA regulation by incorporating fire shields into the support structure. Referring back to FIG. 2, in the area of the engine compartment EC, the fire shields 14 include a plurality of fire panels 22 that are hung from the main beams 16. Referring to FIG. 7, the panels 22 are threadingly engaged with the main beams 16. More preferably, a screw 80 extends through a hole in the panel 22 and engages with a nutplate 82 which is attached to a leg of the main beam 16. The fire panels 22 are preferably made from titanium material and have a thickness of about 0.012 inches. The fire panels 22 are not designed to carry any applied walking loads. Instead, the panels 22 are designed to prevent fire transmission.

Figure 5:
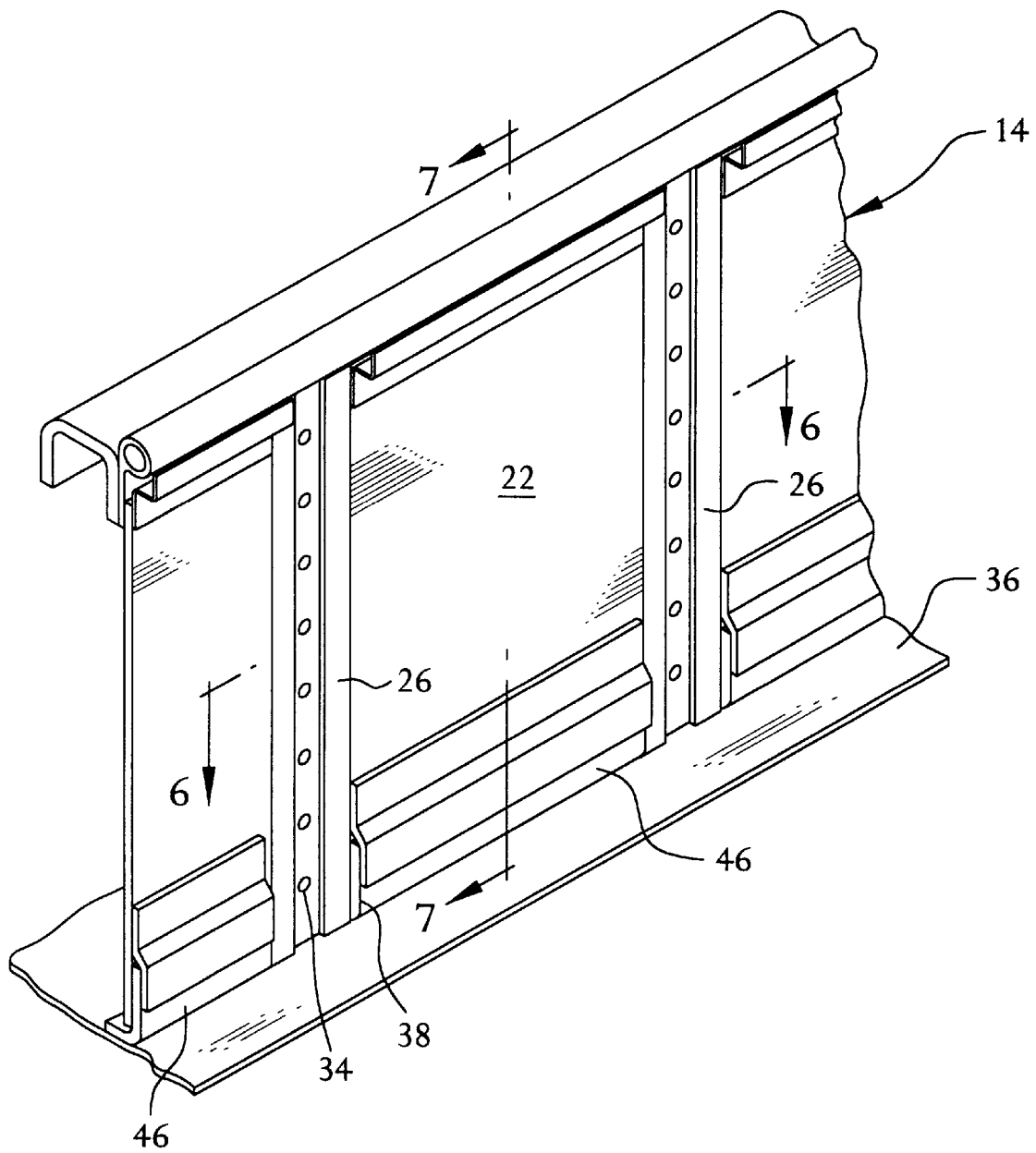
FIG. 5 is a enlarged isometric view for the engine compartment of the main rotor pylon support structure shown in FIG. 2.
Figure 6:
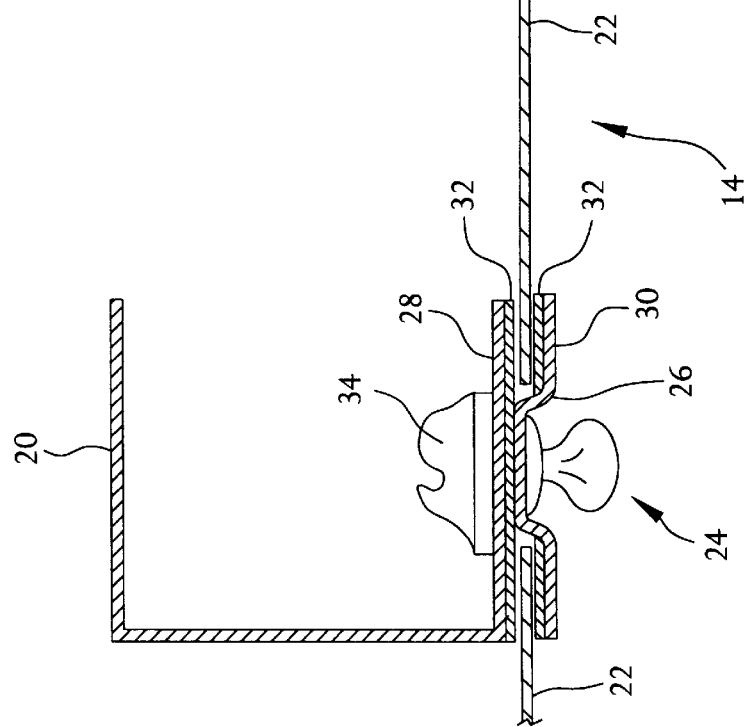
FIG. 6 is a cross-sectional view of the main rotor pylon support structure according to the present invention taken along lines 6—6 in FIG. 5.

In order to prevent load transfer through the fire panels 22, the sides and the bottoms of the fire panels 22 are attached so as to prevent or minimize in-plane load transfer between the fire panel 22 and the surrounding structure. Referring to FIGS. 5 and 6, the fire panels 22 are shown attached to the vertical posts 20 through a sliding attachment 24. More particularly, a seal plate 26 is attached to a flange or leg 28 of the vertical post 20. The seal plate 26 preferably extends along substantially the entire length of the vertical post 20, and is made from titanium material. The seal plate 26 includes at least one offset flange 30 which forms a gap between the vertical post 20 and the seal plate 26 along the length of the seal plate 26. The gap is sized to accept the lateral edge of the fire panel 22. In one preferred embodiment, a TEFLON® seal 32 or similar sealing material is disposed on either or both surfaces which define the gap. (TEFLON® is a registered trademark of E.I. du Pont de Nemours, Inc., Wilmington, Del. for tetrafluoroethylene resin.) The illustrated attachment permits the fire panel 22 to "float" in-plane, while preventing and/or limiting out-of-plane motion of the panel side edge.

As shown in FIG. 6, the seal plate 26 can be attached to the vertical post 20 by a removable fastener 34, such as a CAMLOC® fastener. (CAMLOC® is a registered trademark of Rexnord, Inc., Brookfield, Wis. for a quick release fastener.) The use of a removable fastener 34 permits the panel 22 to be easily detached when access to the engine and/or internal compartment is needed through the support structure 10. If there is no need for access through the support structure 10, the seal plate 26 can be fixedly attached to the vertical post 20, such as by riveting, welding or bonding.

Referring now to FIGS. 5 and 7, a cross-section of the fire panel is shown which illustrates the attachment of the panel to the helicopter upper deck or skin 36, Specifically, the bottom edge of the panel 22 is slidingly engaged with an upward projecting flange 38 that is mounted to the aircraft. As with the side of the fire panel 22, the bottom of the fire panel 22 is attached so as to permit in-plane movement of the panel 22, while substantially preventing and/or limiting out-of-plane motion of the panel edge. In the illustrated embodiment, the bottom edge of the panel 22 includes a channel 40 that includes two spaced arms 42 which define a gap. The gap between the arms 42 is sized to accept the flange 38. As shown, the channel 40 can be formed by attaching a Z-shaped stiffener to the fire panel 22. In this embodiment, the arms 42 of the channel 40 are the overlying portions of the Z-shaped stiffener and the fire panel 22. In light of the teachings provided herein, those skilled in the art would readily appreciate the various alternate ways for forming a non-load bearing attachment for the fire panel 22 which prevents the transmission of fire.

In one preferred embodiment, a TEFLON® seal 44 or similar sealing material is disposed on both sides of the flange 38 to facilitate sealing between the fire panel 22 and the flange 38. Alternatively, the TEFLON® seal 44 can be placed on the inner sides of the arms 42. As shown, the flange 38 is preferably a portion of a angle 46 which is fixedly attached to the aircraft through any conventional means. The angle 46 preferably extends for a substantial portion of the width of the fire panel 22 and is made from titanium with a thickness of between approximately 0.016 and 0.020 inches.

Figure 8:
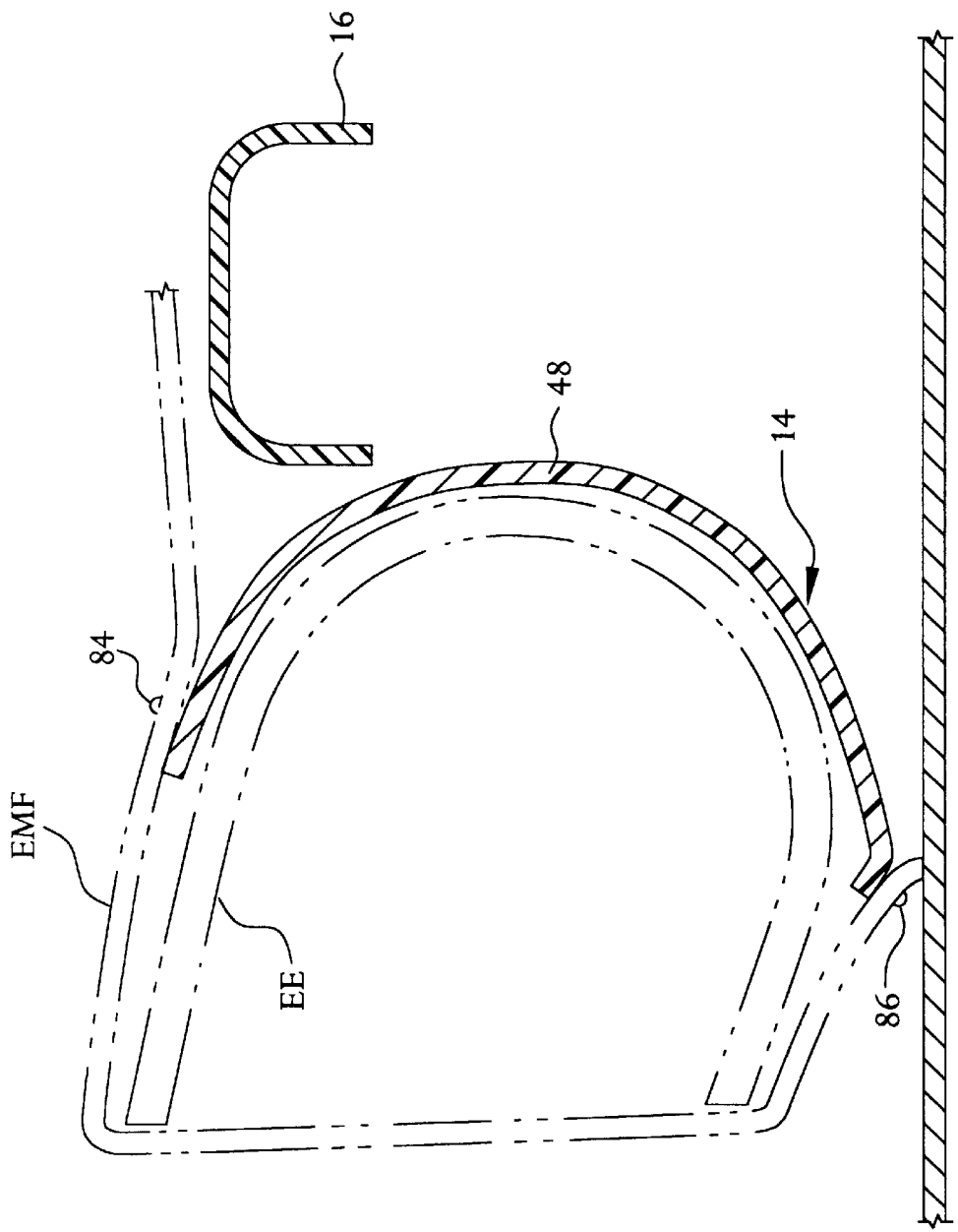
FIG. 8 is a cross-sectional view of the main rotor pylon support structure adjacent the engine exhaust compartment as taken along lines 8—8 in FIG. 2.

The present invention contemplates a different fire shield 14 in the portion of the support structure 10 adjacent to the engine exhaust compartment EEC. In this location, the fire shield 14 is preferably a fire shell 48 that partly surrounds the engine exhaust duct. Referring now to FIGS. 2 and 8, the fire shell 48 is shown as a three-dimensional structure that separates the engine exhaust duct EE from the framing structure 12 and the inner compartments. The fire shell 48 preferably curves in generally the same direction as the engine exhaust duct EE (i.e., away from the framing structure 12). The fire shell 48 is preferably made from titanium material and attached directly to the engine exhaust EE with mechanical fasteners 84.

Since the graphite plies that form the main beam 16 are not designed to withstand high temperature environments, the present invention incorporates a seal 50 to prevent fire from passing from the engine compartment EC to the main beam 16. Referring to FIG. 7, the seal 50 includes a bulbous end 52 and a mounting flange 54. The mounting flange 54 is preferably attached to a leg 56 on the main beam 16. More preferably, the mounting flange 54 is sandwiched between a titanium support angle 58 and the leg 56 of the main beam 16 as shown in the figure. The bulbous end 52 of the seal is designed to contact and seal against the engine compartment cowling (not shown) The seal 50 is preferably made from silicon rubber with a thickness of approximately 0.060 inches and a bulbous end with a diameter of approximately 0.50 inches. The support angle 58 is preferably Z-shaped so as to trap seal and provide additional fire protection.

Figure 1:
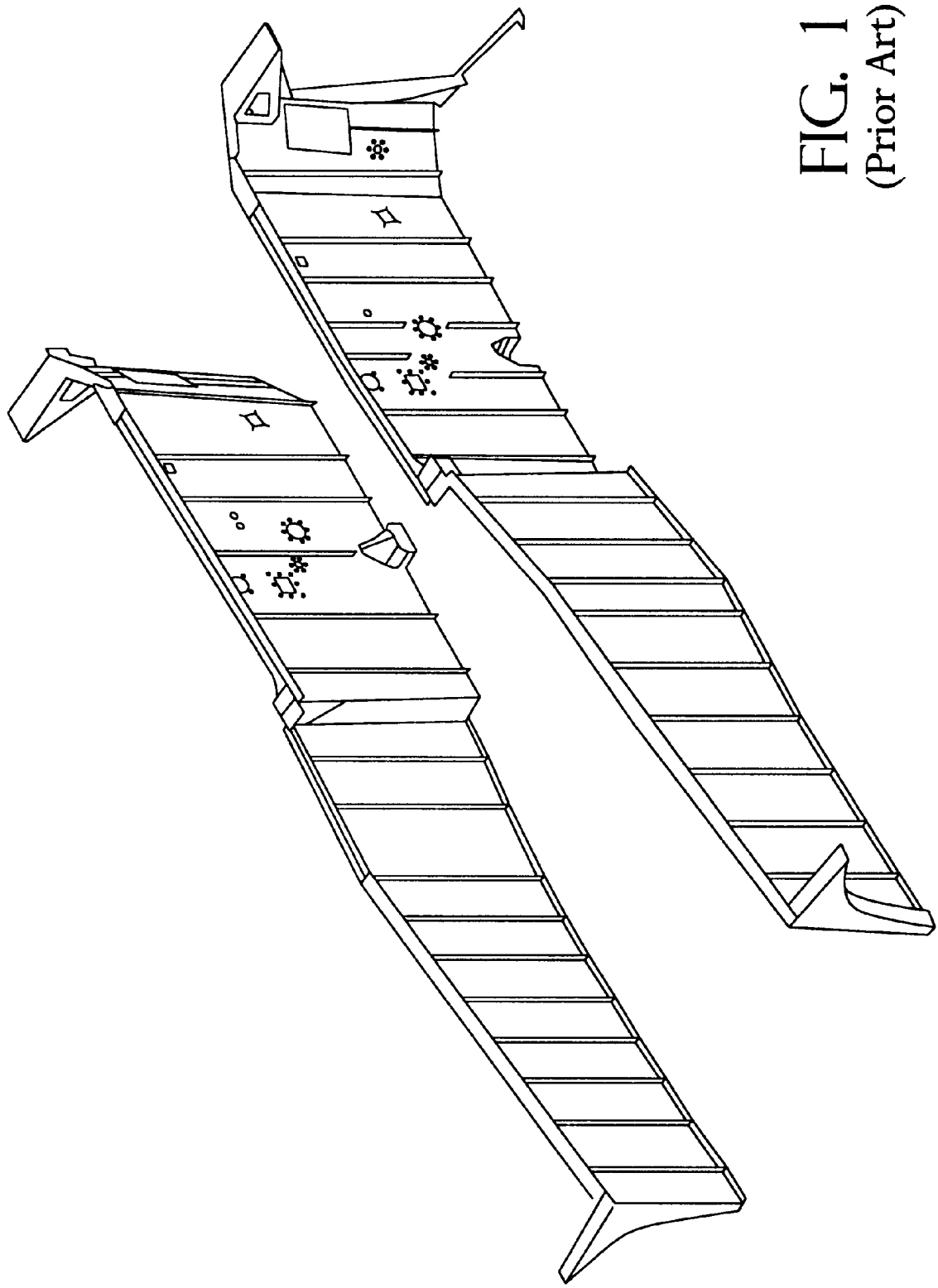
FIG. 1 is a isometric view of a prior art main rotor pylon support structure.

The present invention provides a novel support structure for a helicopter main rotor pylon which is easier to manufacture than comparable prior art support structures. It has been determined that a support structure 10 as described above and shown in FIGS. 2–8 can be assembled in less than half the time than a comparable conventional support structure as shown in FIG. 1.

The components used in the present invention also provide a lightweight structure that supports the anticipated walking loads, while providing easy access between compartments. Furthermore, the present invention complies with FAA regulations by providing a fireproof wall between the engine and the internal aircraft compartments Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A helicopter main rotor pylon support structure comprising:
   a first composite main beam extending adjacent to an engine compartment;
   a plurality of vertical posts attached to and spaced along the first composite main beam, the vertical posts adapted to mount the first composite main beam to the helicopter; and
   a plurality of fire panels mounted to the first composite main beam between adjacent vertical posts, each fire panel having a top edge attached to the first composite main beam, and side edges slidingly engaged with the vertical posts, the sliding engagement limiting out-of-plane displacement of the side edges of the fire panel while permitting in-plane motion, the sliding engagement also adapted to prevent the transmission of fire past the fire panel.

2. A helicopter main rotor pylon support structure according to claim 1 wherein the sliding engagement is provided by a seal plate attached to at least one vertical post, the seal plate having an offset flange which forms a gap between the vertical post and the seal plate, wherein the side edge of the fire panel is slidingly disposed within the gap.

3. A helicopter main rotor pylon support structure according to claim 2 further comprising a sealing material disposed within the gap to facilitate sealing between the side edge and the seal plate.

4. A helicopter main rotor pylon support structure according to claim 2 further comprising a second composite main beam mounted to the aircraft, the second composite main beam being substantially parallel to the first composite main beam and including a plurality of fire panels, wherein first and second composite main beams are made from graphite material.

5. A helicopter main rotor pylon support structure according to claim 1 further comprising a flange member extending upward from the helicopter, each fire panel having a channel formed on and extending along at least a portion of a lower edge, the channel having offset arms defining a gap therebetween, the flange member being located within the gap, the offset arms limiting out-of-plane displacement of the fire panel while permitting in-plane motion.

6. A helicopter main rotor pylon support structure according to claim 5 wherein the fire panel has a stiffener mounted along its lower edge, and wherein the overlying portions of the stiffener and the lower edge of the fire panel form the offset arms of the channel.

7. A helicopter main rotor pylon support structure according to claim 6 further comprising a sealing material disposed between at least one offset arm and the flange member.

8. A helicopter main rotor pylon support structure according to claim 1 further comprising a silicone rubber seal mounted to the first composite main beam adjacent to the engine compartment, the silicone rubber seal having a bulbous end and a mounting flange, the mounting flange being attached to the first composite main beam, the silicone rubber seal adapted to prevent fire in the engine compartment from contacting the first composite main beam.

9. A helicopter main rotor pylon support structure according to claim 1 wherein the first composite main beam also extends adjacent to an engine exhaust duct, the support structure further comprising a curved fire shell mounted to the first composite main beam adjacent to the engine exhaust duct, the fire shell adapted to prevent the transmission of fire from the engine exhaust duct to the first composite main beam.

10. A helicopter main rotor pylon support structure according to claim 9 wherein the fire shell is made from graphite and NEXTEL material.

11. A helicopter main rotor pylon support structure according to claim 1 further comprising
   a second composite main beam extending adjacent to a second engine compartment;
   a plurality of vertical posts attached to and spaced along the second composite main beam, the vertical posts adapted to mount the second composite main beam to the helicopter;
   a plurality of fire panels mounted to the second composite main beam between adjacent vertical posts, each fire panel having a top edge attached to the second composite main beam, and side edges slidingly engaged with the vertical posts, the sliding engagement limiting out-of-plane displacement of the side edges of the fire panel while permitting in-plane motion, the sliding engagement also adapted to prevent the transmission of fire past the fire panel; and
   at least one bridge member attaching to and extending between the first and second main beams.

12. A helicopter main rotor pylon support structure according to claim 11 further comprising a flange member extending upward from the helicopter, each fire panel having a channel formed on and extending along at least a portion of a lower edge, the channel having offset arms defining a gap therebetween, the flange member being located within the gap, the offset arms limiting out-of-plane displacement of the fire panel while permitting in-plane motion.

13. A helicopter main rotor pylon support structure according to claim 11 wherein the sliding engagement is provided by at least one seal plate attached to a vertical post, the seal plate having an offset flange which forms a gap between the vertical post and the seal plate, wherein the side edge of the fire panel is slidingly disposed within the gap.

14. A helicopter main rotor pylon support structure comprising:
   a first composite main beam extending adjacent to a first engine compartment and a first exhaust duct compartment;
   a second composite main beam extending adjacent to a second engine compartment and a second exhaust duct compartment;
   a plurality of bridge members extending between the first and second composite main beams;
   a plurality of vertical posts attached to and spaced along the first and second composite main beams, the vertical posts adapted to mount the first and second composite main beams to the helicopter;
   a plurality of seal plates, each seal plate being mounted to a vertical post; and
   at least one fire panel mounted to each composite main beam, each fire panel having a side edge disposed between a seal plate and a vertical post, the side edge of the fire panel permitted to move in-plane between the seal plate and the vertical post while limited in out-of-plane displacement by the seal plate and the vertical post, the engagement of the side edge and the seal plate adapted to prevent the transmission of fire past the fire panel.

15. A helicopter main rotor pylon support structure according to claim 14 further comprising a flange member extending upward from the helicopter, each fire panel having a channel formed on and extending along at least a portion of a lower edge, the channel having offset arms defining a gap therebetween, the flange member being located within the gap, the offset arms limiting out-of-plane displacement of the fire panel while permitting in-plane motion.

16. A helicopter main rotor pylon support structure comprising:

a first composite main beam extending adjacent to a first engine compartment and a first exhaust duct compartment;

a second composite main beam extending adjacent to a second engine compartment and a second exhaust duct compartment;

a plurality of bridge members extending between the first and second composite main beams;

a plurality of vertical posts attached to and spaced along the first and second composite main beams, the vertical posts adapted to mount the first and second composite main beams to the helicopter;

at least one flange member extending upward from the helicopter; and at least one fire panel mounted to one of the composite main beams, the fire panel having a channel formed on and extending along at least a portion of a lower edge, the channel having offset arms defining a gap therebetween, the flange member being located within the gap, the offset arms limiting out-of-plane displacement of the fire panel while permitting in-plane motion.

17. A helicopter main rotor pylon support structure according to claim 16 further comprising a plurality of seal plates, each seal plate being mounted to a vertical post, and wherein each fire panel has a side edge disposed between a seal plate and a vertical post, the side edge of the fire panel permitted to move in-plane between the seal plate and the vertical post while limited in out-of-plane displacement by the seal plate and the vertical post, the engagement of the side edge and the seal plate adapted to prevent the transmission of fire past the fire panel.

* * * * *